(12) United States Patent
Moritomo

(10) Patent No.: US 9,313,234 B2
(45) Date of Patent: Apr. 12, 2016

(54) COMMUNICATION DEVICE, METHOD FOR CONTROLLING COMMUNICATION DEVICE, AND STORAGE MEDIUM

(71) Applicant: CANON KABUSHIKI KAISHA, Tokyo (JP)

(72) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/261,229

(22) Filed: Apr. 24, 2014

(65) Prior Publication Data
US 2014/0325085 A1  Oct. 30, 2014

(30) Foreign Application Priority Data

Apr. 26, 2013 (JP) ................................ 2013-093888

(51) Int. Cl.
| | |
|---|---|
| H04L 29/06 | (2006.01) |
| H04W 4/00 | (2009.01) |
| H04W 12/00 | (2009.01) |
| H04L 29/12 | (2006.01) |
| H04W 84/12 | (2009.01) |

(52) U.S. Cl.
CPC ............. *H04L 65/1013* (2013.01); *H04W 4/00* (2013.01); *H04W 12/00* (2013.01); *H04L 61/1511* (2013.01); *H04L 61/2015* (2013.01); *H04W 84/12* (2013.01)

(58) Field of Classification Search
CPC . G06F 3/1236; G06F 3/1292; H04L 65/1013; H04L 67/104; H04L 67/16; H04L 43/0811; H04W 8/005; H04W 76/02; H04W 76/023; H04W 84/12
See application file for complete search history.

(56) References Cited

U.S. PATENT DOCUMENTS

| | | | |
|---|---|---|---|
| 2008/0112333 A1* | 5/2008 | Busch et al. ................... | 370/252 |
| 2011/0280233 A1* | 11/2011 | Choi et al. ..................... | 370/338 |
| 2013/0057908 A1* | 3/2013 | Park .............................. | 358/1.15 |
| 2013/0201981 A1* | 8/2013 | Niwa ............................. | 370/338 |
| 2013/0229944 A1* | 9/2013 | Montemurro et al. ......... | 370/254 |
| 2014/0108618 A1* | 4/2014 | Lee et al. ...................... | 709/219 |

FOREIGN PATENT DOCUMENTS

| | | |
|---|---|---|
| JP | 2009-152689 A | 7/2009 |
| JP | 2011-35768 A | 2/2011 |

OTHER PUBLICATIONS http://blog.broadcom.com/wp-content/uploads/2013/10/Wi-Fi-Direct-White-Paper.pdf.

* cited by examiner

*Primary Examiner* — Brian J Gillis
*Assistant Examiner* — Gil H. Lee
(74) *Attorney, Agent, or Firm* — Canon U.S.A., Inc., IP Division

(57) ABSTRACT

A communication device includes a connection unit configured to perform connection processing with another communication device, an acquisition unit configured to acquire information indicating whether the other communication device is able to execute a predetermined service before the connection unit executes the connection processing, and a control unit configured to control a port used in communications with the other communication device, based on the information acquired by the acquisition unit.

7 Claims, 7 Drawing Sheets

FIG.5A

| DEVICE | FIRST PREDETERMINED SERVICE |
|---|---|
| CAMERA 102 | SERVICE IS PROVIDABLE. |
| CAMERA 103 | SERVICE IS NOT PROVIDED. |

FIG.5B

| DEVICE | PROVIDABLE SERVICE |
|---|---|
| CAMERA 102 | SERVICE IS PROVIDABLE. |

FIG.5C

| IS SERVICE SEARCH EXECUTED? | NO |
|---|---|

FIG.5D

| PORT | LOCK STATE |
|---|---|
| xxx | LOCK |
| yyy | LOCK |
| zzz | LOCK |

FIG.5E

| PORT | LOCK STATE |
|---|---|
| xxx | UNLOCK |
| yyy | LOCK |
| zzz | LOCK |

FIG.5F

| PORT | LOCK STATE |
|---|---|
| xxx | UNLOCK |
| yyy | LOCK |
| zzz | LOCK |

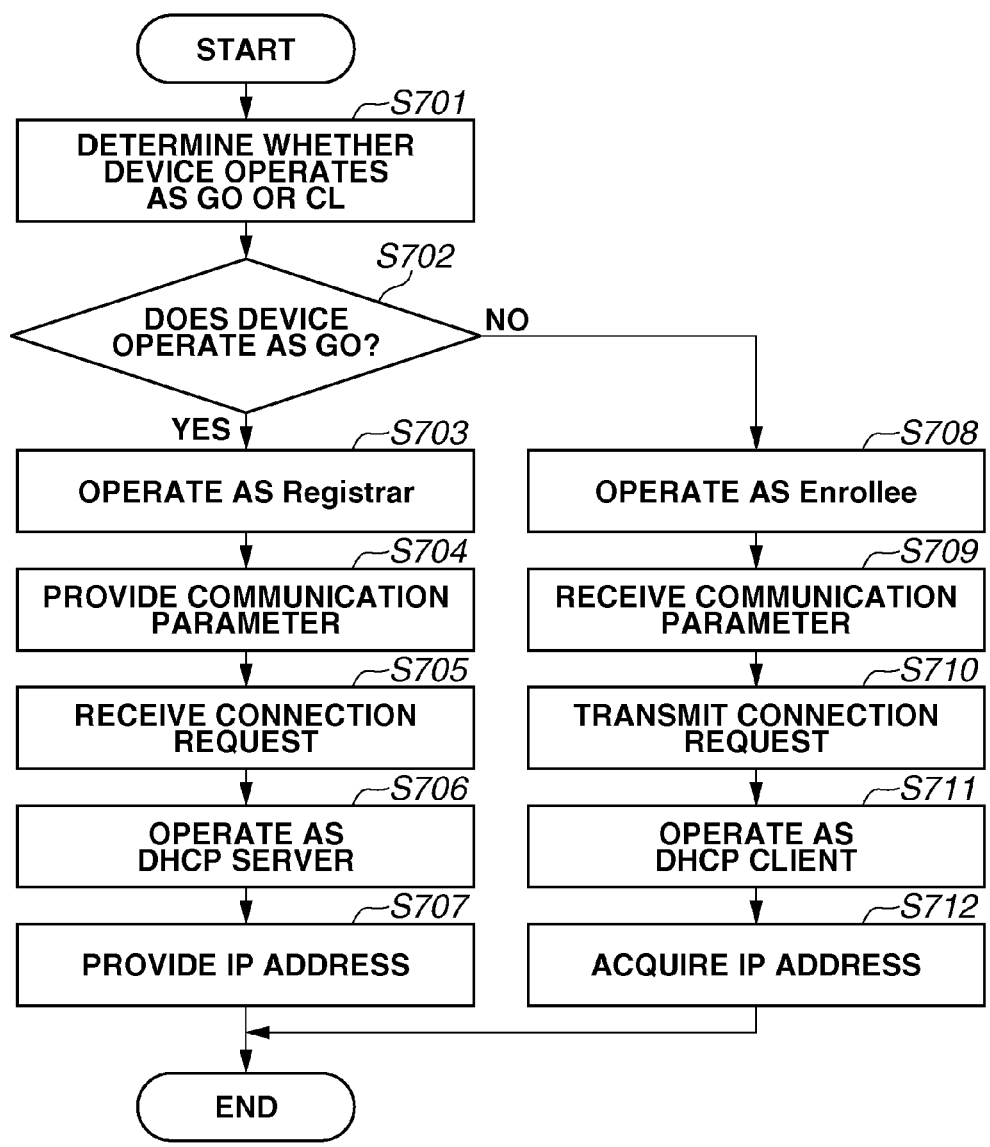

COMMUNICATION DEVICE, METHOD FOR CONTROLLING COMMUNICATION DEVICE, AND STORAGE MEDIUM

BACKGROUND

1. Field

Aspects of the present invention generally relate to a communication device, a method for controlling a communication device, and a storage medium.

2. Description of the Related Art

In recent years, Wi-Fi Alliance has developed a standard, Wi-Fi Direct®. In Wi-Fi Direct®, a function (service discovery function) of advertising and searching service information supported by an upper layer application is defined as an option function. With the service discovery function, service information held by an electronic device as a connection destination can be acquired before executing connection processing. When the service information is acquired, information about a port used in the service can be also acquired, and communications can be performed through the port.

However, when the connection destination device does not have the service discovery function, the information about a port used in the service of the connection destination device cannot be acquired. Thus, communications cannot be performed through the port, thereby leading to low usability.

However, when all the ports are unlocked, an unintended device can establish the connection, thereby leading to a lower security.

SUMMARY

An aspect of the present invention is generally directed to achieving higher security while securing connectivity.

According to an aspect of the present invention, a communication device includes a connection unit configured to perform connection processing with another communication device, an acquisition unit configured to acquire information indicating whether the other communication device is able to execute a predetermined service before the connection unit executes the connection processing, and a control unit configured to control a port used in communications with the other communication device based on the information acquired by the acquisition unit.

Further features of the present disclosure will become apparent from the following description of exemplary embodiments with reference to the attached drawings.

BRIEF DESCRIPTION OF THE DRAWINGS

FIGS. 5A to 5F are diagrams illustrating information stored in a storage unit 201.
FIG. 7 is a flowchart realized by the printer 101.

DESCRIPTION OF THE EMBODIMENTS

Various exemplary embodiments will be described in detail below with reference to the drawings.

Figure 1:
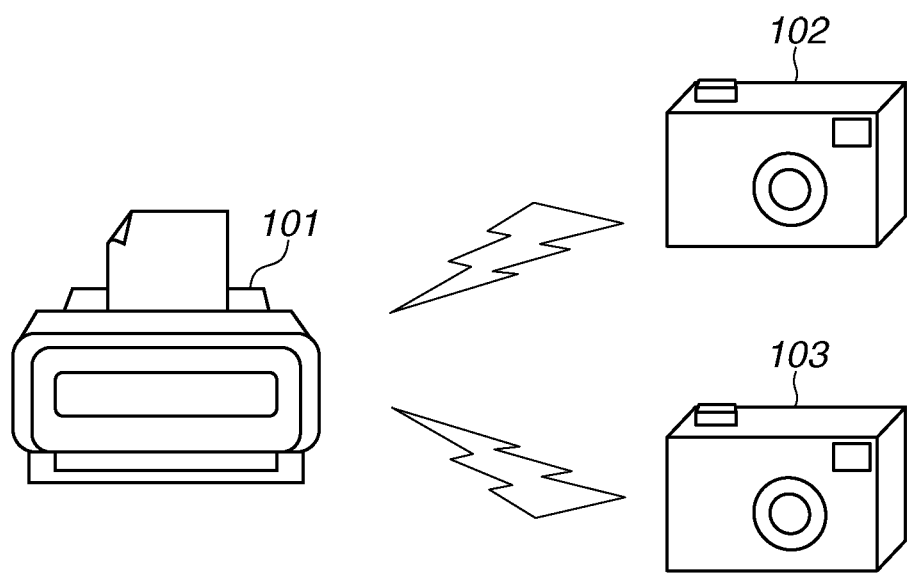
FIG. 1 is a diagram illustrating a network configuration.

FIG. 1 illustrates a network configuration of a communication system according to the present exemplary embodiment. A printer 101 is an example of a communication device, and performs communications conforming to IEEE 802.11 series. Cameras 102 and 103 are examples of another communication device, and perform communications conforming to IEEE 802.11 series with the printer 101. The communication device and the other communication device are not limited to the printer 101 and the cameras 102 and 103, and may be other devices such as a storage, a cellphone (including a smartphone), a personal computer (PC), and a medical device. The camera 102 can provide a first predetermined service described later, while the camera 103 does not provide the first predetermined service.

Figure 2:
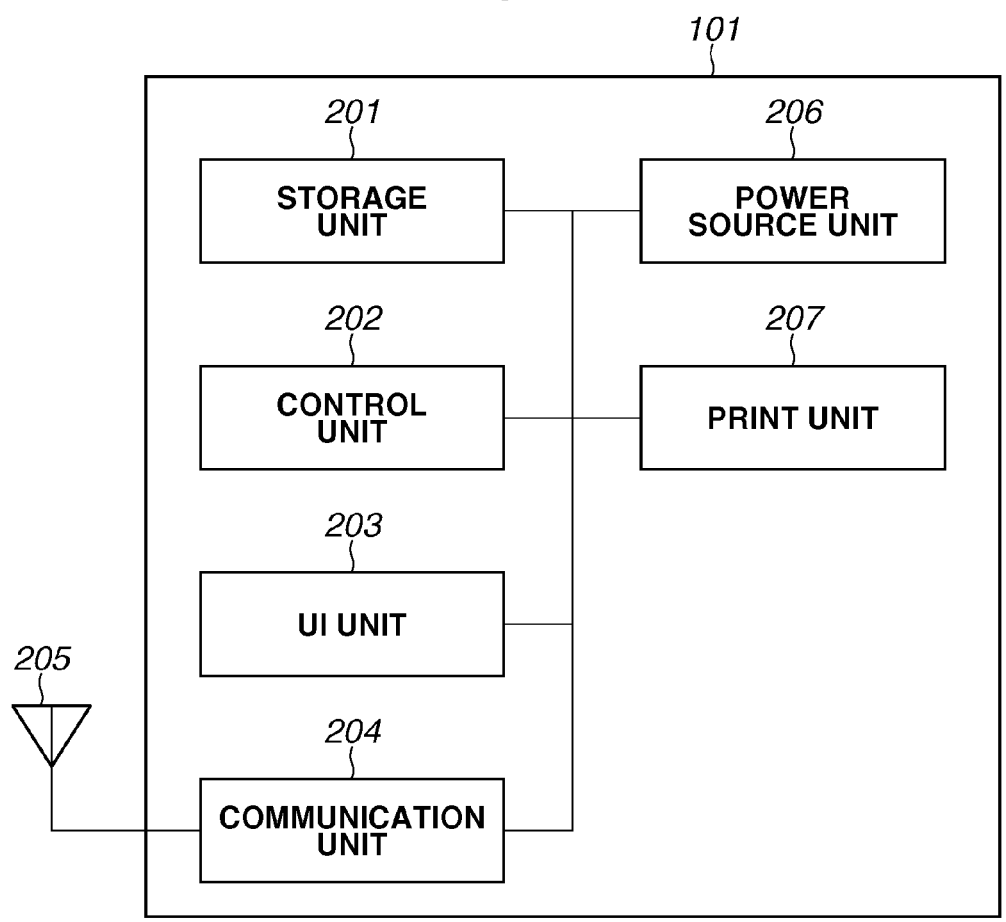
FIG. 2 is a hardware configuration diagram.

FIG. 2 illustrates a hardware configuration of the printer 101. A plurality of hardware modules illustrated in FIG. 2 may be realized as a single hardware module. A single hardware module illustrated in FIG. 2 may also be realized as a plurality of hardware modules.

The storage unit 201 includes a read only memory (ROM) and a random-access memory (RAM). The storage unit 201 stores a program (including an operating system (OS)) and various types of information such as image data and a communication parameter for executing various operations described later. In addition to a memory such as the ROM and the RAM, other storage mediums may be used as the storage unit 201. The storage medium includes a flexible disk, a hard disk, an optical disk, a magneto optical disk, a compact-disc read only memory (CD-ROM), a CD-recordable (CD-R), a magnetic tape, a nonvolatile memory card, and a DVD. The control unit 202 includes a central processing unit (CPU) or a micro processing unit (MPU), and executes the program stored in the storage unit 201 to control the entire printer 101. The control unit 202 may cooperate with the OS executed by the control unit 202 to control the entire printer 101.

A UI unit 203 displays various types of information and receives various operations from a user. A communication unit 204 performs communications conforming to IEEE 802.11 series through an antenna 205. A power source unit 206 supplies power to hardware modules illustrated in FIG. 2. The power source unit 206 acquires the power from a commercial power supply. However, the power source unit 206 is not limited thereto, and may be configured to have an internal battery. A print unit 207 prints and outputs the image data stored in the storage unit 201. Image data received from the camera 102 may also be temporarily stored in the storage unit 201, and can be output through the print unit 207.

Figure 3:
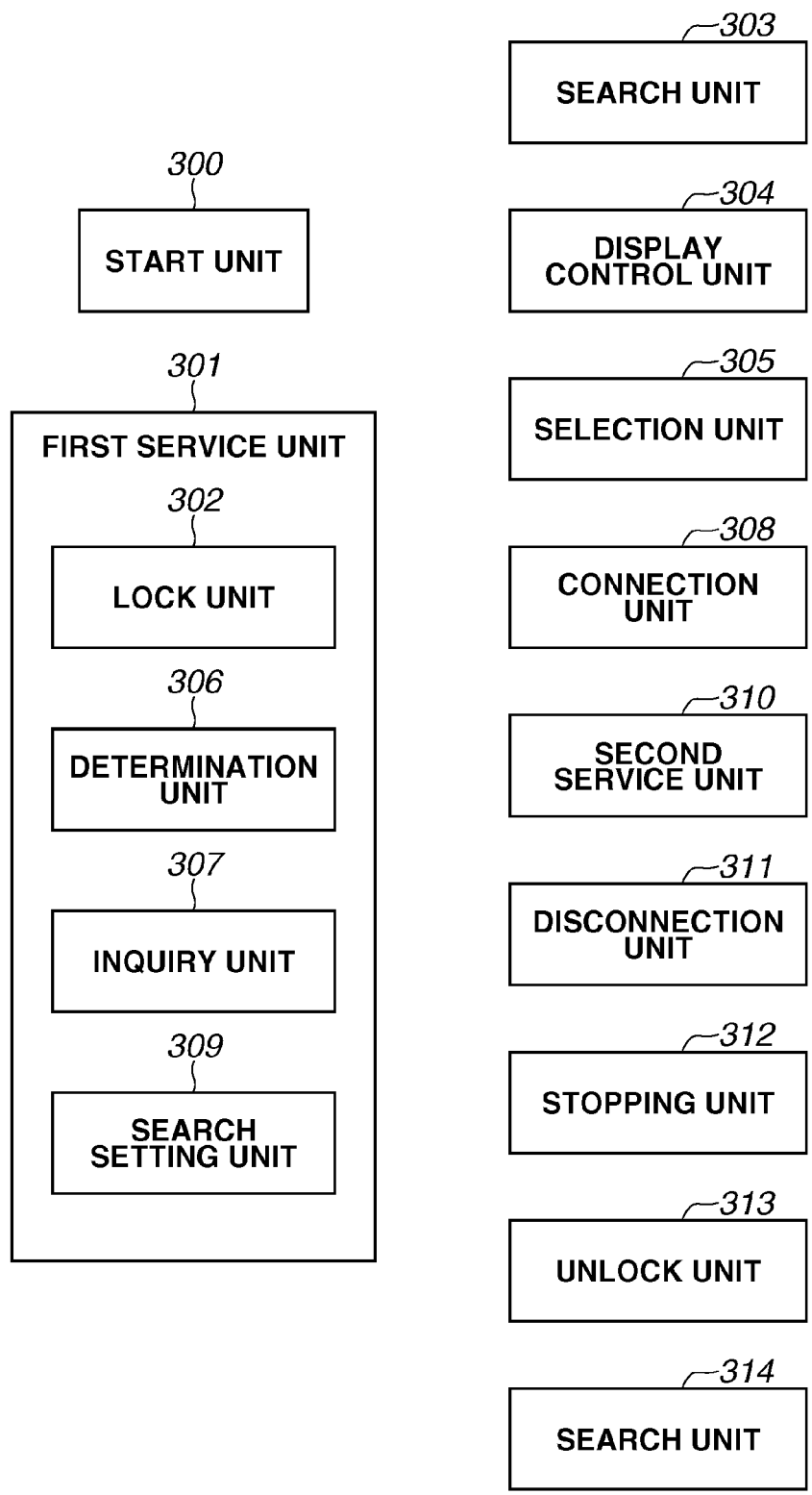
FIG. 3 is a software functional block diagram.

FIG. 3 illustrates software modules. The controller 202 of the printer 101 reads out the program stored in the storage unit 201 to realize the software modules. A plurality of software modules illustrated in FIG. 3 may be realized as a single software module. A single software module illustrated in FIG. 3 may also be realized as a plurality of software modules. Further, the software modules illustrated in FIG. 3 may at least partly be realized by a hardware module. For example, a predetermined compiler may be used to automatically generate a dedicated circuit on a field programmable gate array (FPGA) from a program for realizing a software module. The circuit may be used as a hardware module having the function of the software module. A Gate Array circuit may be formed as in the case of the FPGA, and realized as a hardware module.

A start unit 300 starts a first service unit 301 described later. The first service unit 301 includes a lock unit 302, a determination unit 306, an inquiry unit 307, and a search setting unit 309.

The lock unit 302 can be used by the communication unit 204 of the printer 101 to communicate with the other communication device, and locks a port defined by transmission control protocol (TCP). A search unit 303 searches a camera in the periphery of the printer 101. A display control unit 304 makes the UI unit 203 display information of detected devices. A selection unit 305 uses the UI unit 203 to make a user decide a connection destination from detected devices.

The determination unit 306 determines whether the device selected by the user can provide the first predetermined service. The inquiry unit 307 makes inquiries about the detail of a service provided by the device selected by the user. The connection unit 308 executes wireless connection processing with the other communication device in accordance with a connection procedure defined in Wi-Fi Direct®. The search setting unit 309 determines whether to execute service search conforming to universal plug and play (UPnP) or multicast domain name system (mDNS). A second service unit 310 cooperates with the connected other communication device to execute predetermined service processing.

A disconnection unit 311 performs disconnection processing from the other communication device. A stop unit 312 stops the first service unit 301. An unlock unit 313 unlocks the port locked by the lock unit 302. A search unit 314 performs the service search conforming to UPnP or mDNS.

In the present exemplary embodiment, the first service unit 301 is a platform that operates on an upper layer of a layer wirelessly connected by the connection unit 308. Thus, the first service unit 301 performs communications using the wireless connection established by the connection unit 308. The communications may be performed using another service function unit on a further upper layer of the first service unit 301. The layer of the service unit 301 and the layer wirelessly connected by the connection unit 308 may operate on the same layer.

Figure 4:
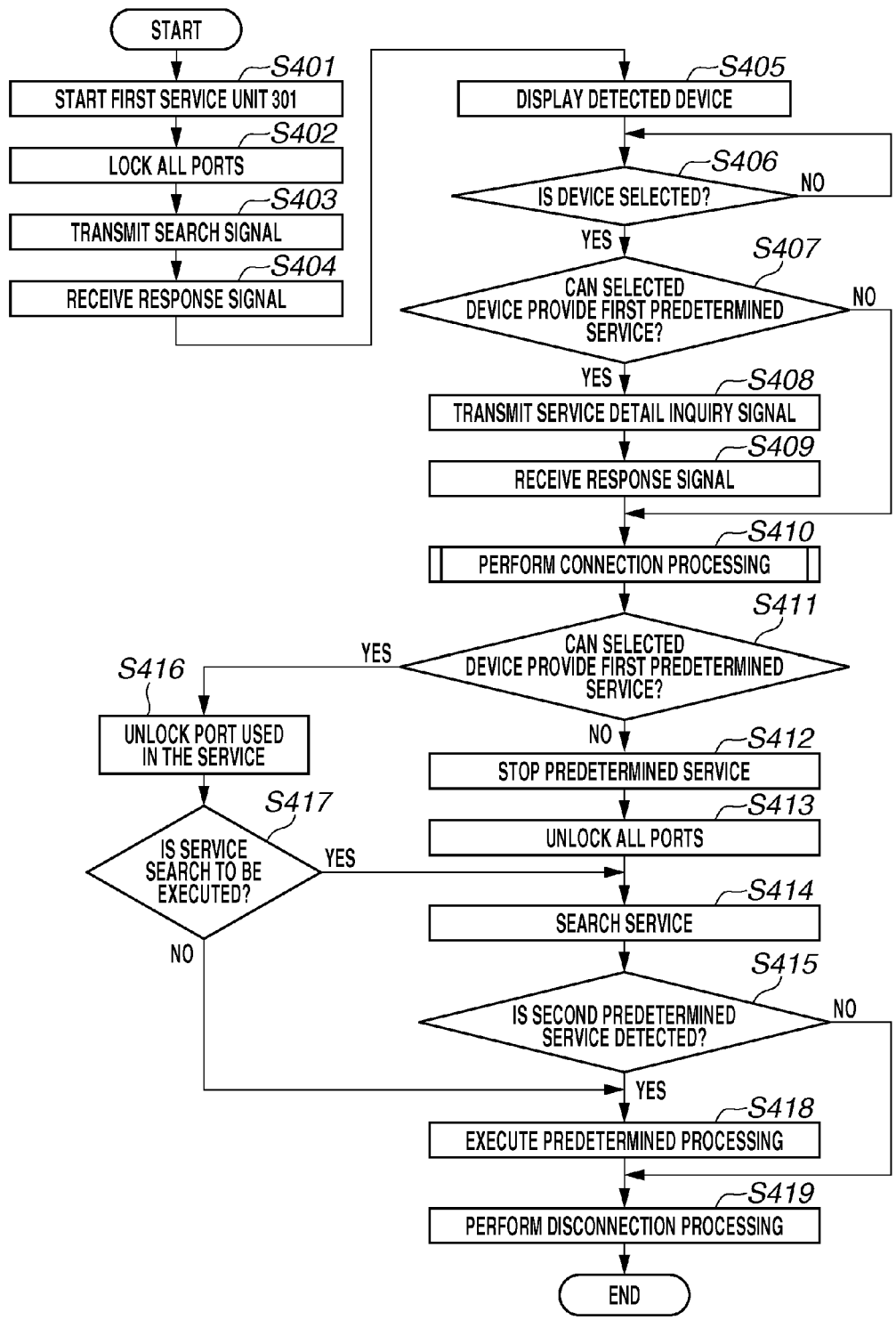
FIG. 4 is a flowchart realized by a printer 101.

A flowchart is illustrated in FIG. 4. The control unit 202 of the printer 101 realizes the processing shown in the flowchart by reading out the program stored in the storage unit 201, when the printer 101 is connected to the camera 102 and outputs the data received by the camera 102.

First, in step S401, the control unit 202 starts the first service unit 301 in response to an operation on the UI unit 203 by the user. The operation includes instructing establishment of a connection, for example. When the first service unit 301 starts, in step S402, the lock unit 302 locks a port. The port is defined by TCP and can be used by the communication unit 204 of the printer 101 to communicate with the other communication device. Ports other than a predetermined port are locked. For the locked port, the lock unit 302 associates the locked port and information indicating the lock state, and stores the resultant information in the storage unit 201 as illustrated in FIG. 5D. FIG. 5D exemplarily illustrates three typical ports. However, the number of ports is not limited thereto, and a larger number of ports are generally prepared. By thus locking the port, possibility that an unintended user accesses the printer 101 is reduced. Therefore, it is possible to reduce the possibility that an unnecessarily large processing load is imposed on the printer 101, and improve the security.

Then, in step S403, the search unit 303 broadcasts a search signal for searching a camera in a periphery of the printer 101. The search signal is Probe Request defined in IEEE 802.11 series, for example. Upon receiving the search signal from the printer 101, the cameras 102 and 103 each transmit a response signal for the search signal. Then, the search unit 303 receives the response signal from each of the cameras 102 and 103 in step S404. The response signal is Probe Response defined in IEEE 802.11 series, for example.

In the searching in the exemplary embodiment, the aforementioned search signal and the response signal are used. Thus, the search can be executed by distinguishing a device that can provide the first predetermined service from a device that does not provide the first predetermined service, as follows. The printer 101 transmits the search signal including information related to the first predetermined service. In response, the device that can provide the first predetermined service transmits the response signal with information indicating that the device can provide the first predetermined service. The device that does not provide the first predetermined service transmits the response signal without the information indicating that the device can provide the first predetermined service. Alternatively, the device that does not provide the first predetermined service may transmit the response signal with information indicating that the device does not provide the first predetermined service.

The camera 102 is detected as the device that can provide the first predetermined service, and the camera 103 is detected as the device that does not provide the first predetermined service. The search unit 303 associates detected device information with the information indicating whether the device can provide the first predetermined service, and stores the resultant information in the storage unit 201. FIG. 5A illustrates information stored in the storage unit 201, as a result of the search executed by the search unit 303.

Figure 6:
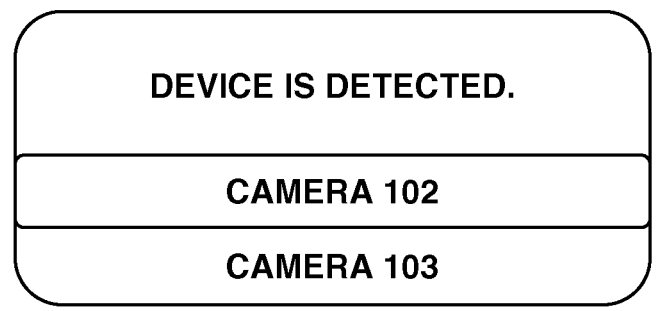
FIG. 6 is a diagram illustrating a display on a user interface (UI) unit 203.

Next, in step S405, the display control unit 304 reads out the information stored in the storage unit 201, and causes the UI unit 203 to display the information of the detected devices as illustrated in FIG. 6. The display control unit 304 causes the UI unit 203 to display the information about the camera 102 and the information about the camera 103. In step S406, with the use of the UI unit 203, the selection unit 305 makes the user select the connection destination from the detected devices.

First, a case is described where the user selects the camera 102 that can provide the first predetermined service. When the user selects a device, the determination unit 306 determines whether the device selected by the user can provide the first predetermined service in step S407. The determination unit 306 reads out the information stored in the storage unit 201 to execute the determination.

The processing proceeds to step S408 when the selected device can provide the first predetermined service, and proceeds to step S410 when the selected device does not provide the first predetermined service. Since the camera 102 selected by the user can provide the first predetermined service, the processing proceeds to step S408.

In step S408, the inquiry unit 307 transmits, by unicast, a signal (inquiry signal) inquiring the detail of the service provided by the device (camera 102 herein) selected by the user. The inquiry signal is service discovery query (SD Query) defined in Wi-Fi Direct®, for example. Upon receiving SD Query, the camera 102 transmits the response signal to the SD Query. The response signal is service discovery response (SD Response) defined in Wi-Fi Direct®, for example, and includes information about all the services provided by the camera 102.

The inquiry unit 307 receives the response signal (SD Response, for example) from the camera 102, and acquires the information about all the services provided by the camera 102, in step S409. The service provided by the camera 102 includes a print image transmission service, an image sharing service, and a remote image capturing service. Each of the services is referred to as a second service. The inquiry unit 307 further associates the device information with the acquired service information, and stores the resultant information in the storage unit 201. FIG. 5B illustrates information stored in the storage unit 201 as a result of the search performed by the inquiry unit 307.

Then, in step S410, the connection unit 308 executes connection processing with the camera 102 in accordance with a predetermined connection procedure defined in Wi-Fi Direct®. The predetermined connection procedure defined in Wi-Fi Direct® is briefly described with reference to FIG. 7.

First, in step S701, the connection unit 308 determines which of the printer 101 and the camera 102 operates as a wireless LAN access point (base station), and which of the printer 101 and the camera 102 operates as a wireless LAN client (terminal). In Wi-Fi Direct®, a device that operates as the wireless LAN access point is referred to as group owner (GO), and a device that operates as the wireless LAN client is referred to as client (CL).

In step S703, the device determined as GO (Yes in Step S702) operates as Registrar that provides a communication parameter used in a wireless network generated by GO, and provides the communication parameter to the communication destination device in step S704. The communication parameter used in the wireless network generated by GO includes a service set identifier (SSID) (network identifier), an encryption key, an encryption method, an authentication key, an authentication method, and a frequency channel. Registrar is a communication parameter providing device defined by Wi-Fi protected setup (WPS).

In step S705, the device determined as GO receives a connection request signal from the connection destination device. Here, the connection request signal is Association Request signal defined in IEEE 802.11 series. The device determined as GO operates as a dynamic host configuration protocol (DHCP) server that provides an IP address in step S706, and determines and provides the IP address of the communication destination device in step S707.

The device determined as CL (No in step S702) operates as Enrollee that acquires the communication parameter from GO operating as Registrar in step S708, and receives the communication parameter from Registrar in step S709. In step S710, CL transmits the connection request signal defined in IEEE 802.11 series based on the acquired communication parameter, and connects to the wireless network generated by GO.

The device determined as CL operates as a DHCP client that acquires the IP address in step S711, and acquires the IP address from the DHCP server in step S712.

The printer 101 and the camera 102 realize the operations illustrated in FIG. 7, to execute the wireless connection processing between the printer 101 and the camera 102.

When the wireless connection is established, the determination unit 306 determines whether the device selected by the user can provide the first predetermined service in step S411. The determination unit 306 reads out the information stored in the storage unit 201 to execute the determination. The connected camera 102 can provide the first predetermined service, and thus the processing proceeds to step S416.

In step S416, the unlock unit 313 acquires, from the camera 102, information about a port used in a service obtained as a result of the inquiry by the inquiry unit 307, and unlocks the port based on the acquired information. The unlock unit 313 changes the information indicating the locked state of the locked port to information indicating the unlock state as illustrated in FIG. 5E, and stores the resultant information in the storage unit 201. It is assumed in the figure that the port used in the service is xxx.

Then, in step S417, the search setting unit 309 determines whether to execute the service search conforming to UPnP or mDNS. It is assumed that the user may set in advance whether the service search conforming to UPnP or mDNS is executed, and the user setting is stored in the storage unit 201 as illustrated in FIG. 5C. The search setting unit 309 reads out the information stored in the storage unit 201 to determine whether to execute the service search conforming to UPnP or mDNS. Whether to execute the service search may be selected by the user in step S417, instead of being set by the user in advance.

When the service search conforming to UPnP or mDNS is executed, the processing proceeds to step S414. The processing in and after step S414 will be described later. A case is described where the service search conforming to UPnP or mDNS is not executed.

When the service search conforming to UPnP or mDNS is not executed, the processing proceeds to step S418, where the second service unit 310 cooperates with the camera 102 to execute predetermined service processing. For example, the second service unit 310 receives image data from the camera 102, and executes print processing of the received image data. Then, when the predetermined service processing is completed, the disconnection unit 311 disconnects the printer 101 from the camera 102 in step S419, and thus the processing is completed.

Next, a case will be described where the user selects the camera 103 that does not provide the first predetermined service. When the device is selected, the determination unit 306 determines whether the device selected by the user can provide the first predetermined service in step S407. The determination unit 306 reads out the information stored in the storage unit 201 to execute the determination. The camera 103 does not provide the first predetermined service, and thus the processing proceeds to step S410 where the connection unit 308 wirelessly connects to the camera 103.

When the wireless connection is established, the determination unit 306 determines whether the device selected by the user can provide the first predetermined service in step S411. The determination unit 306 reads out the information stored in the storage unit 201 to execute the determination. The camera 103 does not provide the first predetermined service, and thus the processing proceeds to step S412.

In step S412, the stop unit 312 stops the first service unit 301 started in step S401. Then, in step S413, the unlock unit 313 unlocks the port locked in step S402. The unlock unit 313 changes the information indicating the lock state of the locked port from the lock state to the unlock state as illustrated in FIG. 5F, and stores the resultant information in the storage unit 201. By thus unlocking the port, search processing in step S414 can be executed.

In step S414 the search unit 314 executes the service search conforming to UPnP or mDNS. As a result, when the search unit 314 has not detected a second predetermined service, the processing proceeds to step S418 where the disconnection unit 311 disconnects the printer 101 from the camera 103, and the processing is completed. When the search unit 314 has detected the second predetermined service, the second service unit 310 cooperates with the camera 103 to execute the predetermined service processing in step S417. Then, when the predetermined service processing is completed, the disconnection unit 311 disconnects the printer 101 from the camera 103, and the processing is completed.

As described above, a communication device (for example, a printer) receives information indicating whether another communication device (for example, a camera) can execute a predetermined service before the connection processing between these communication devices is executed. The communication device controls a port used for communications with the other communication device based on the received information. Thus, the port is controlled based on the information indicating whether the predetermined service obtained before the connection processing is executable. Therefore, higher security can be achieved while securing connectivity.

In the above-described exemplary embodiment, the communication device is described as a printer and the other communication device is described as a camera, but the communication devices are not limited thereto. The communication device may be a camera including an image capture unit, and can transmit image data captured by the image capture unit to the printer, and the other communication device may be the printer. Exemplary embodiments are not limited to the combination of the camera and the printer, and may be applied to any combination of a smartphone, a personal computer (PC), a personal digital assistant (PDA), and a storage.

In the above-described exemplary embodiment, a port is locked when the first predetermined service is started. Thus, it is possible to reduce the possibility that an unintended user accesses the printer 101. Thus, it is possible to reduce the possibility that an unnecessarily large processing load is imposed on the printer 101, and improve the security.

The search signal is transmitted, and the response signal is received before the connection processing is executed. Thus, the searching can be executed by distinguishing the device that can provide the first predetermined service from the device that does not provide the first predetermined service. When connecting to the device that does not provide the first predetermined service, the port locked when the first predetermined service is started is unlocked, whereby the connectivity can be secured.

The above-described exemplary embodiments provide for controlling a port based on information indicating whether a predetermined service acquired before connection processing is executable, whereby higher security can be achieved while securing connectivity.

OTHER EMBODIMENTS

Additional embodiments of the present invention can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-093888 filed Apr. 26, 2013, which is hereby incorporated by reference herein in its entirety.

What is claimed is:

1. A communication device comprising:
a memory configured to store a program; and
a processor that is in communication with the memory, the processor configured to control:
a connection unit configured to perform a connection process with another communication device;
a lock unit configured to lock, before the connection unit executes the connection process with the another communication device, a plurality of ports used in communication;
an acquisition unit configured to acquire, before the connection unit executes the connection process with the another communication device, information indicating whether the another communication device is conforming to a predetermined service; and
an unlock unit configured to
unlock one or more of the locked plurality of ports when the acquired information indicates that the another communication device is conforming to the predetermined service, wherein the one or more of the locked plurality of ports is used in the predetermined service, and
unlock all of the locked plurality of ports locked by the lock unit when the acquired information indicates that the another communication device is not conforming to the predetermined service.

2. The communication device according to claim 1, the processor further configured to control a transmission unit configured to wirelessly transmit a search signal for searching for the another communication device,
wherein the acquisition unit receives a response signal transmitted wirelessly in response to the search signal and acquires the information included in the response signal.

3. The communication device according to claim 1, wherein the connection unit executes the connection process with the another communication device in accordance with a connection procedure conforming to Wi-Fi Direct.

4. The communication device according to claim 1, wherein the communication device is a printer that prints data received from the another communication device.

5. The communication device according to claim 1, wherein the communication device is a camera that transmits image data to the another communication device.

6. A method for controlling a communication device, the method comprising:
performing a connection process with another communication device;
locking, before the connection process with the another communication device is executed, a plurality of ports used in communication;
acquiring, before the connection process with the another communication device is executed, information indicating whether the another communication unit is conforming to a predetermined service;
unlocking one or more of the locked plurality of ports when the acquired information indicates that the another communication device is conforming to the predetermined service, wherein the one or more of the locked plurality of ports is used in the predetermined service, and
unlocking all of the locked plurality of ports locked during the locking step when the acquired information indicates that the another communication device is not conforming to the predetermined service.

7. A non-transitory computer-readable storage medium storing computer executable instructions that cause a computer to implement a method, the method comprising:
- performing a connection process with another communication device;
- locking, before the connection process with the another communication device is executed, a plurality of ports used in communication;
- acquiring, before the connection process with the another communication device is executed, information indicating whether the another communication unit is conforming to a predetermined service;
- unlocking one or more of the locked plurality of ports when the acquired information indicates that the another communication device is conforming to the predetermined service, wherein the one or more of the locked plurality of ports is used in the predetermined service, and
- unlocking all of the locked plurality of ports locked during the locking step when the acquired information indicates that the another communication device is not conforming to the predetermined service.

* * * * *